United States Patent Office 3,446,370
Patented May 27, 1969

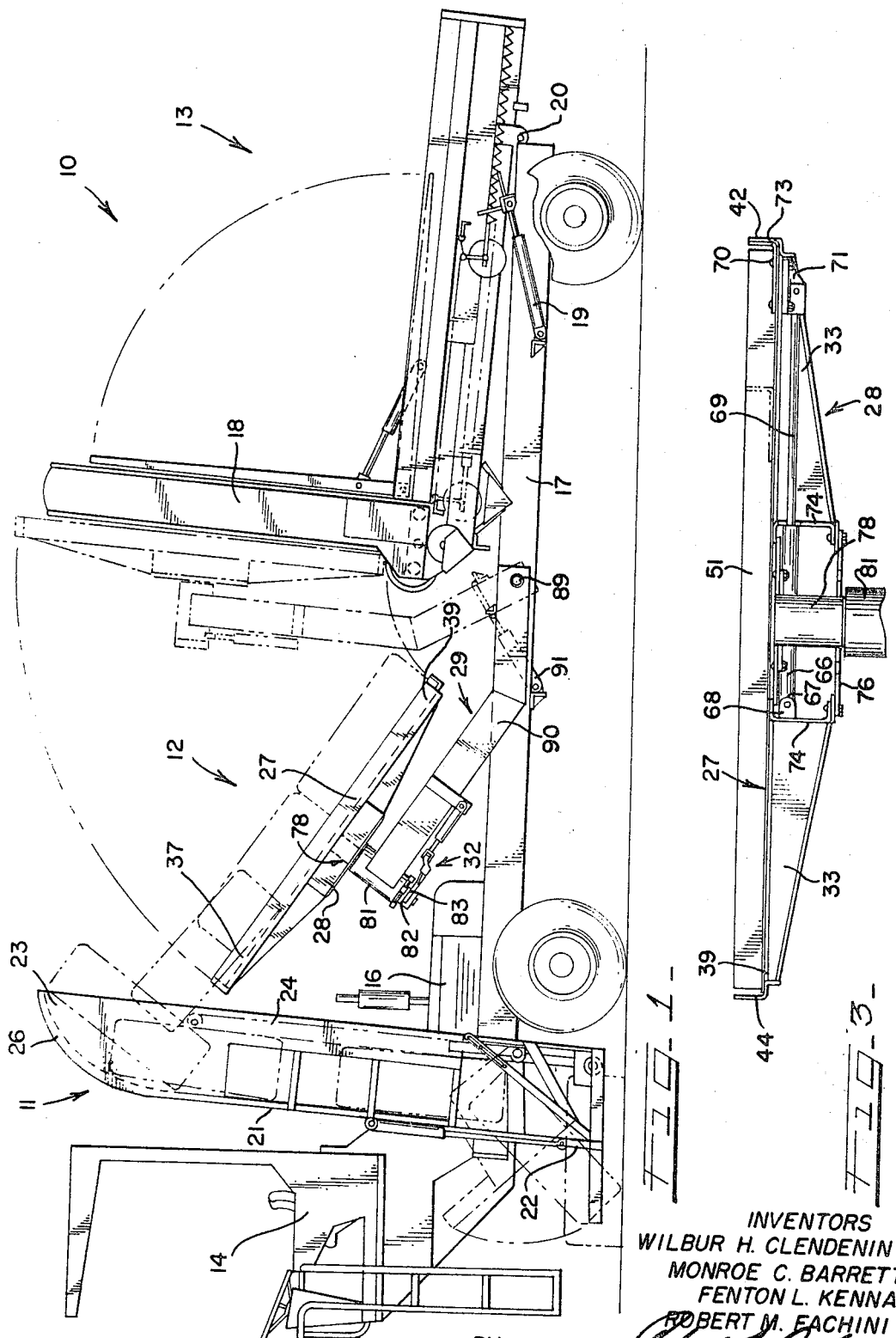

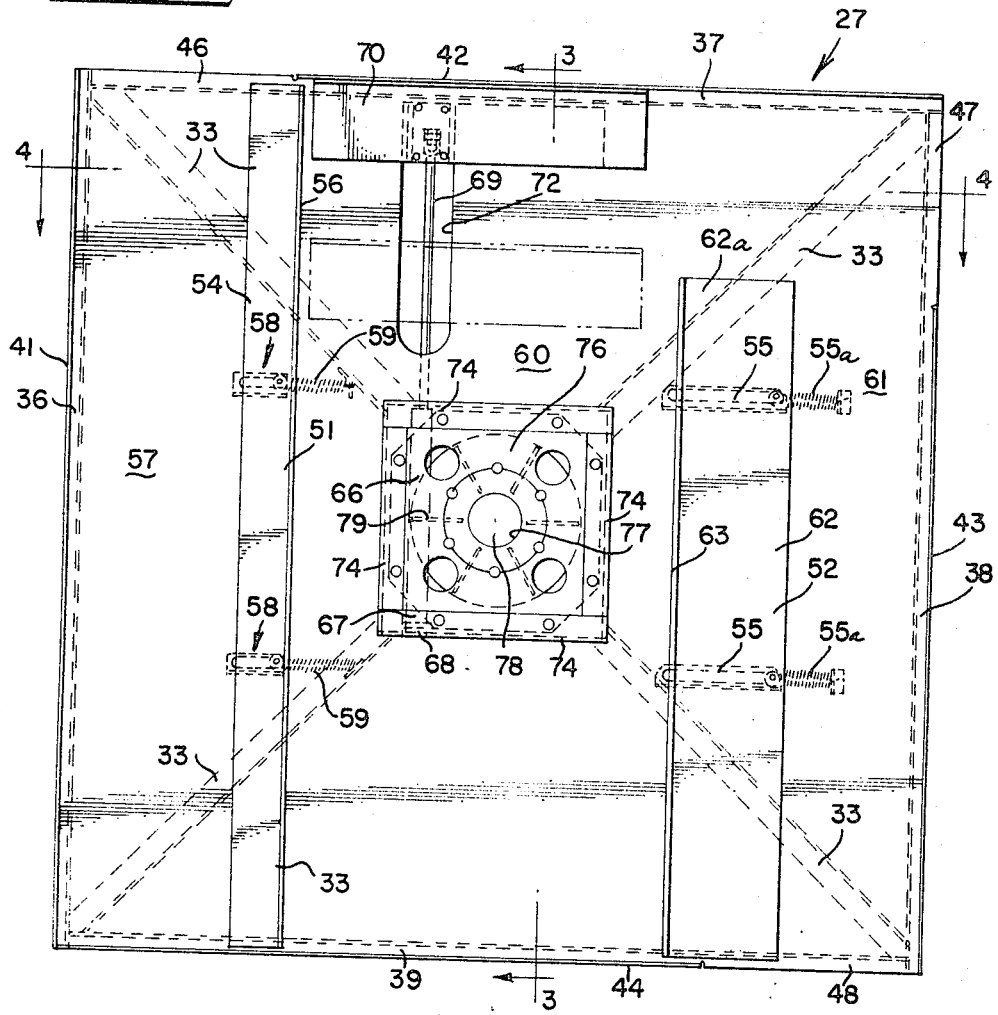

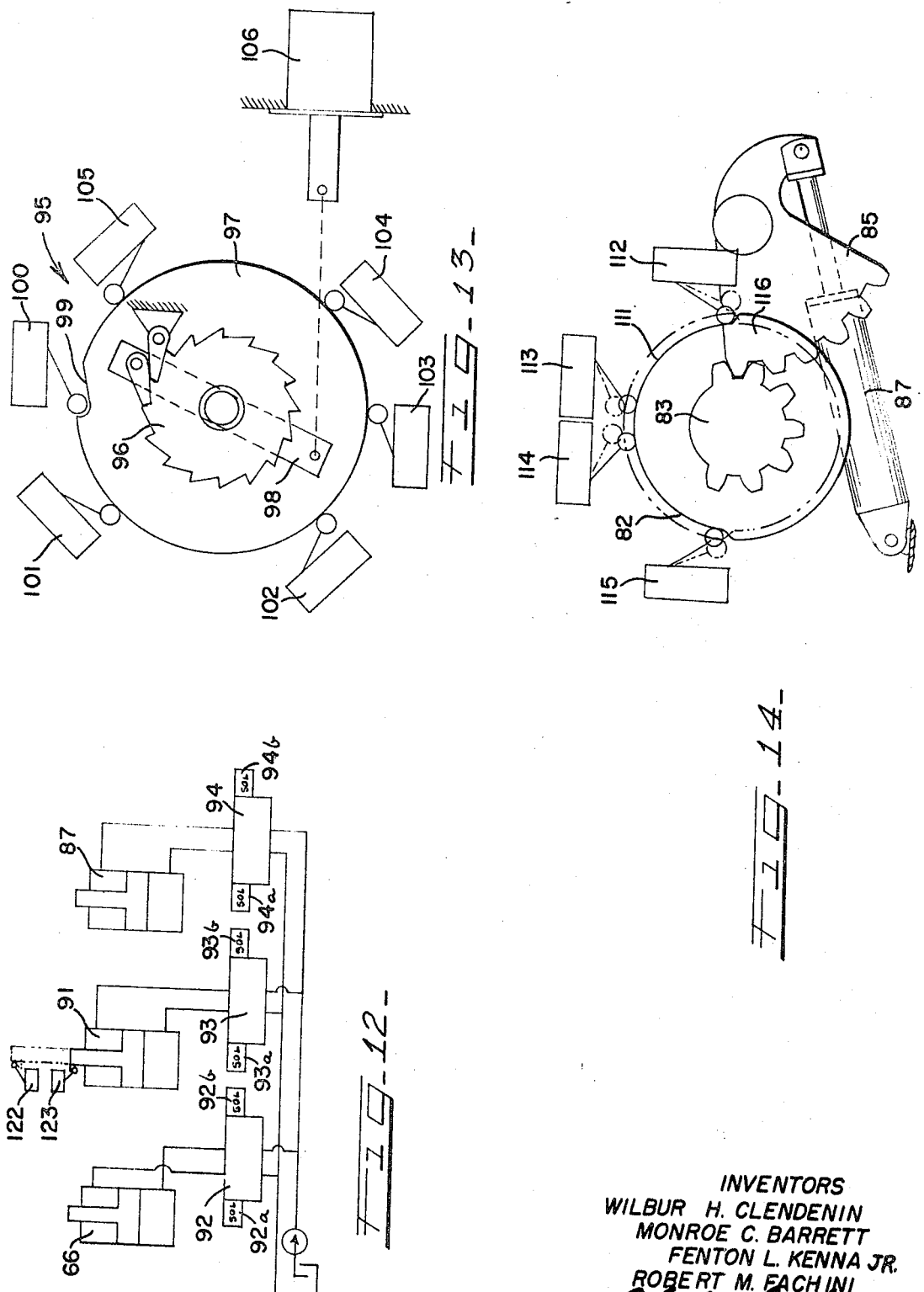

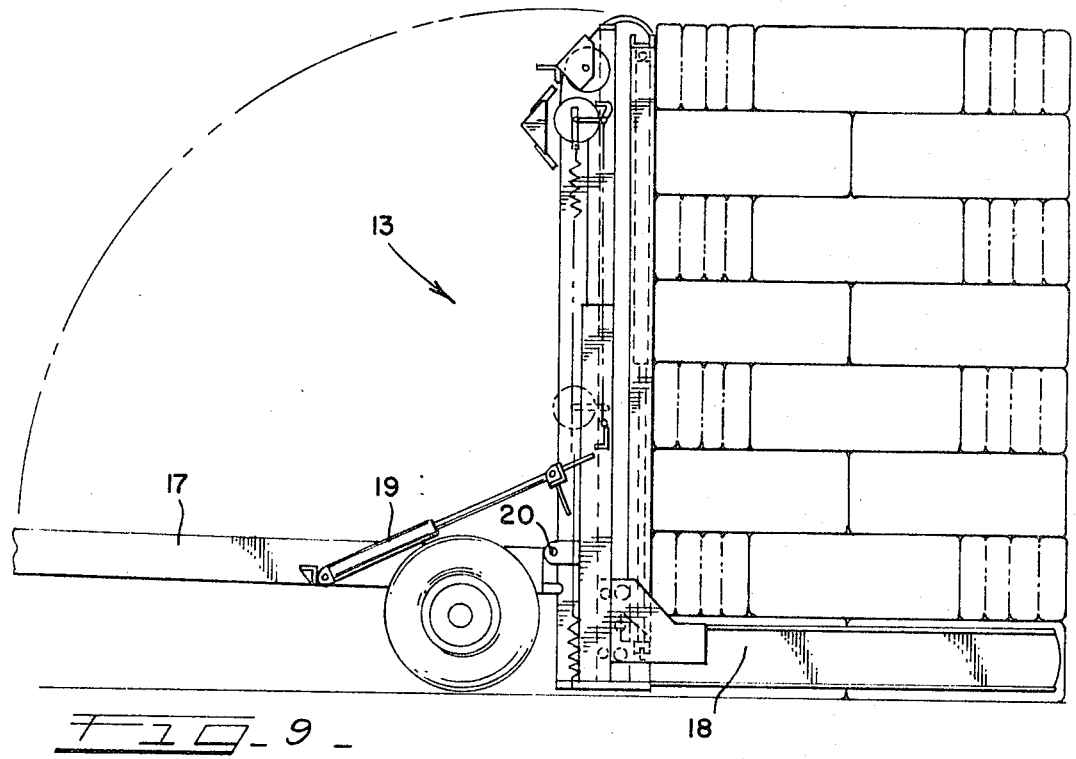
FIG. 9
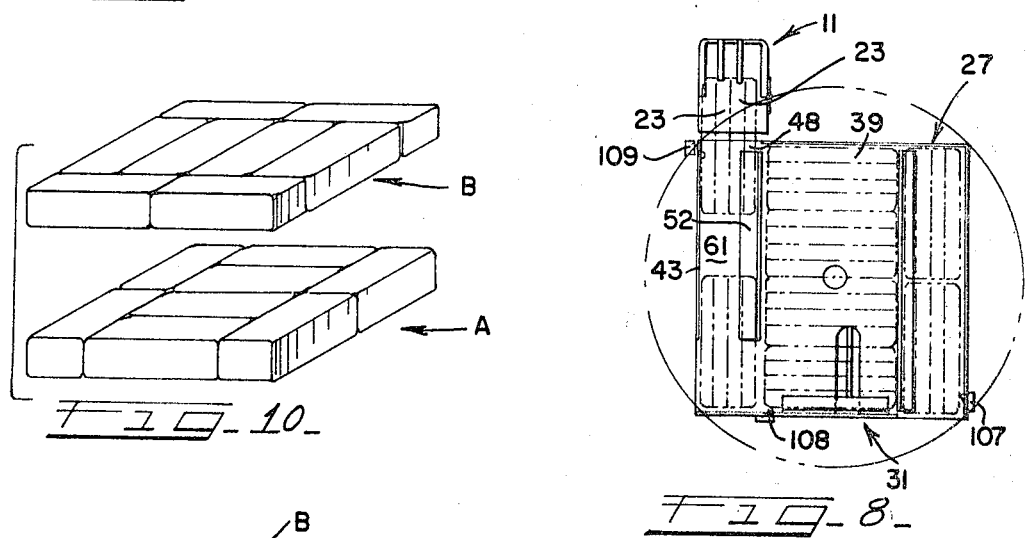
FIG. 10
FIG. 8
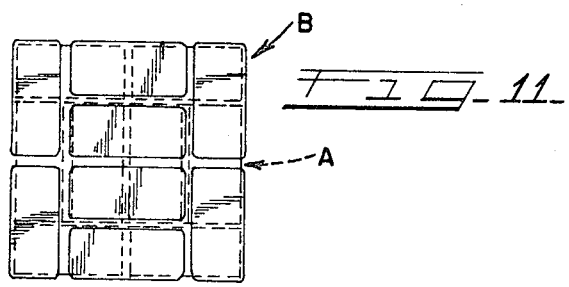
FIG. 11
INVENTORS
WILBUR H. CLENDENIN
MONROE C. BARRETT
FENTON L. KENNA JR.
ROBERT M. FACHINI
BY
ATT'Y.

3,446,370
ROTARY ACCUMULATOR FOR AUTOMATIC BALE HANDLING VEHICLE
Wilbur H. Clendenin, Ava, Ill., and Monroe C. Barrett, Fenton L. Kenna, Jr., and Robert M. Fachini, Memphis, Tenn., assignors to International Harvester Company, Chicago, Ill., a corporation of Delaware
Filed Jan. 15, 1968, Ser. No. 697,945
Int. Cl. B65g 57/28; B60p 1/16
U.S. Cl. 214—6
13 Claims

ABSTRACT OF THE DISCLOSURE

A bale wagon for mechanically accumulating a load of bales in an interlocked pattern. The bale wagon comprises an accumulator for receiving bales individually and arranging them to form a layer, and means for rotating the accumulator in 90° increments so that adjacent layers may be accumulated angularly displaced from each other, the effect of such displacement being to position the bales of one layer in a crosstied relation with those of adjacent layers.

BACKGROUND AND SUMMARY OF THE INVENTION

This invention relates generally to a method of stacking baled hay, and more specifically to a mechanism for accumulating baled hay in a stack characterized by interlocking layers.

The automatic bale wagon is a labor saving device which functions to mechanically handle bales from the field to the storage area. Briefly, the bale wagon operates to pick up bales individually from the ground, or from the discharge of a baler; accumulate the individual bales forming a load; transport the load to a storage site; and deposit the load intact on the ground.

For the bale wagon to function properly, the bales must be accumulated in a pattern such that, when deposited on the ground, they produce a stable stack. Prior to the advent of the automatic bale wagon, stack stability was attained by manually accumulating the bales in an interlocked pattern. (An interlocked pattern defines a stack wherein bales are crosstied that is, vertically adjacent bales are arranged at right angles to each other.) Although it has long been recognized that bales stacked in such a pattern produce a stable stack, no automatic device has been developed which mechanically accumulates bales in a completely interlocked pattern.

It is therefore the general purpose of this invention to provide a bale wagon capable of producing a stable stack. The stack stability is attained by accumulating alternate layers in such a pattern that the bales of each layer are disposed crosswise of the vertically adjacent bales so that the interlocking effect tends to hold the bales in a self-sustaining stack. To achieve this end, the bale wagon is equipped with a layer-forming platform which functions to accumulate individual bales and arrange them into a layer according to a pre-determined pattern. The layer is then deposited as a vertical tier on a receiving bed and a succeeding layer is accumulated in the identical pattern. Prior to delivering the second layer to the receiving bed, the accumulator is pivoted 90° so that when the second layer is deposited adjacent the first layer, the bales of one layer will be angularly displaced 90° from those of the other layer. The bales of the first layer are thusly disposed crosswise of the bales of the second layer giving the interlocked pattern.

A particular feature of this invention is the pattern in which the layer is accumulated. The objective of the accumulator is, of course, to arrange the bales in such a pattern that a portion of the bales overlays or interlocks bales of adjacent layers. The present invention contemplates the use of a single pattern for all layers, the interlock of adjacent bales being accomplished by angularly displacing alternate layers 90°.

The method of stacking bales contemplated by this invention comprises three basic steps: forming one layer according to a predetermined pattern, forming a second layer according to the identical pattern, and arranging the second layer in overlaying relationship to and 90° angularly displaced from, the first layer. The pattern contemplated is such that 90° angular displacement between the two layers, provides for the interlocking of bales of the first layer by bales of the second layer, and hence a stable stack.

The objects of this invention may be summarized as follows:

To provide a method of stacking bales in a completely interlocked pattern;

To provide a bale wagon operative to mechanically handle the bales from the field to the central storage area;

To provide a bale wagon capable of forming a stable stack;

To provide a bale wagon operable to accumulate a load of bales stacked in an interlocked pattern; and To provide a bale wagon with an accumulator operable to accumulate bales arranged crosswise of each other.

These and other objects will become apparent to those skilled in the art from the following disclosures and the drawings.

DRAWINGS

FIGURE 1 is a side elevational view of the bale wagon contemplated by this invention;

FIGURE 2 is a plan view of an accumulator used in the bale wagon shown in FIGURE 1;

FIGURE 3 is a sectional view of the accumulator shown in FIGURE 2 and taken generally along line 3—3 of FIGURE 2;

FIGURE 4 is another sectional view of the accumulator taken along line 4—4 of FIGURE 2;

FIGURE 8 is another schematic of the accumulator shown at the final stage in the accumulating operation;

FIGURE 9 is a fragmentary view of the bale wagon illustrating the upended action of the stack-receiving bed in depositing the load upon the ground;

FIGURE 10 is an exploded view of adjacent layers illustrating the relationship of the bales in the crosstied pattern;

FIGURE 11 is a plan view of the bale stack as deposited on the ground illustrating the relationship of two adjacent layers;

FIGURE 12 is a diagrammatic view of the hydraulic system used to actuate the various components of the bale wagon shown in FIGURE 1; and FIGURES 13 and 14 are simplified diagrammatic presentations of portions of the accumulator control system.

DESCRIPTION OF THE PREFERRED EMBODIMENT

Structure

Figure 5:
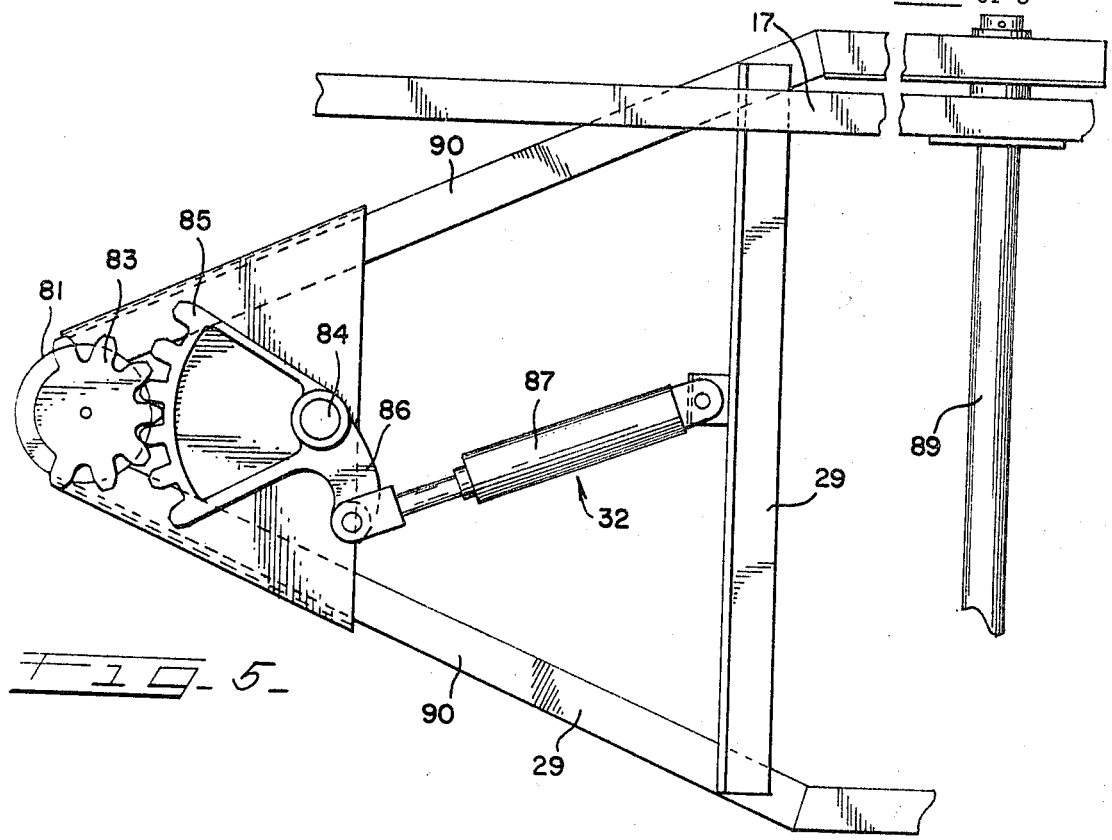
FIGURE 5 is a plan view of the structure supporting the accumulator on the bale wagon.

With reference to FIGURE 1, a bale wagon 10 constructed in accordance with the principles of this invention is shown to comprise generally a pickup elevator 11, a bale accumulator 12, and a receiving bed 13. As illustrated, the main components enumerated above as well as incidental components such as an operator's cab 14 and an engine 16 are supported by a wheel mounted chassis 17.

Briefly, the operation of the bale wagon is as follows: Ground supported bales are picked up and elevated by the elevator 11 and deposited on the accumulator 12. In its home bale-receiving position (solid line position of FIGURE 1), the accumulator 12 receives individual bales and arranges them according to a predetermined pattern. When the layer is completed, the accumulator is pivoted to its layer-delivering position (broken-line position of FIGURE 1) where the layer is deposited on the receiving bed 13. The accumulator 12 is then returned to its home position and the layer forming process repeated. Now as the second layer is deposited on the bed 13, the first layer is pushed rearwardly along the bed 13, the vertical attitude of the first layer being maintained by a carriage 18 which moves rearwardly therewith. It should be noted that the first layer provides support for the second layer and the second for the third, etc. The layer forming process is repeated until a complete load of bales is accumulated on the storage bed 13, whereupon the bale wagon 10 is driven to the storage area.

A hydraulic ram 19 interconnects the chassis 17 and the bed 13 and is actuable to upend the bed 13 about pivot connection 20 (see FIGURE 9). In the upended position, the vertical layers become horizontal layers with each layer overlaying the preceding layer. Thus, it will be appreciated that the relationship of the vertically adjacent bales in the ground-deposited stack is determined by the accumulator 12. Since this invention concerns primarily the means for accumulating a layer of bales, the following description is restricted to the accumulator 12 and its related parts. A detailed description of the storage bed 13 is presented in assignee's co-pending case, Ser. No. 697,663 filed Jan. 15, 1968.

The elevator 11 includes a frame 21 which has formed therein a bale inlet 22 at its lower end and a discharge 23 at its upper end. An endless conveyor 24 interconnects the inlet 22 and the discharge 23 so that bales entering the inlet 22 are conveyed vertically and discharged at end 23. A deflector 26 guides the bale through the discharge end 23.

The accumulator 12, for purposes of simplicity and clarity, may be considered as having a platform 27, a substructure 28, an A-frame 29, a pusher assembly 31, and rotary drive means 32. As illustrated in FIG. 1, the platform 27 in the home position is inclined rearwardly so that as bales are deposited thereon by the elevator 11, they will gravitate to the lower extremity of the platform 27.

Figure 6:
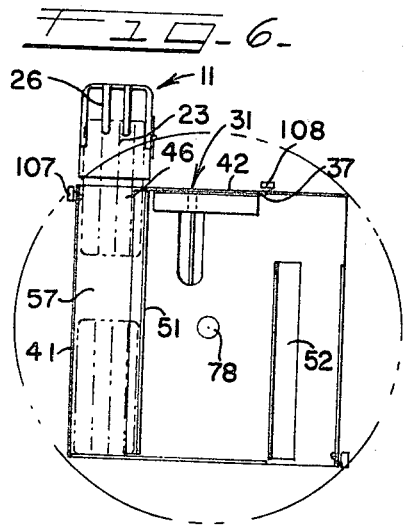
FIGURE 6 is a simplified schematic view of the accumulator shown at one stage in the operation.

As will be described in detail below, the platform 27 is pivotable on the A-frame 29 between three operating stations, hereafter referred to as the first station (see FIGURE 6), the second station (see FIGURE 7), and the third station (see FIGURE 8). The structure and operation of the accumulator 12 will be described with reference to one of these stations.

As best seen in FIGURES 2, 3, and 4, the platform 27 represents a continuous sheetmetal plate overlaying the substructure 28 which includes radial brace members 33. The platform 27 is in the form of a plane square having rectangularly disposed sides 36, 37, 38 and 39. The sides 36, 37, 38 and 39 are respectively bound by longitudinal guide members 41, 42, 43, and 44. The guide members 41-44 extend normal to the plane of the platform 27 and serve to maintain the alignment of bales on the platform 27. Guide 41 extends substantially the entire length of side 36; whereas guides 42, 43, and 44 have openings 46, 47, and 48, respectively, formed therein.

A pair of longitudinally extending intermediate guides 51 and 52 partition the platform 27 into sections. Guide 51 is L-shaped in cross section, having one leg 54 in sliding engagement with the platform 27, and another leg 56 rectangularly disposed to leg 54 and extending perpendicular upward from the platform 27. The guides 41 and 51 are arranged in a parallel relationship and define a bale passageway 57 therebetween. With the accumulator 12 at the first operating station (FIGURE 6) the passageway 57 is adapted to receive bales deposited on the platform 27 through opening 46. The opening 46 and the passageway 57 are sized such to permit a bale to pass lengthwise therethrough. In order that the passageway 57 conform to a variable bale width, guide 51 is slidably mounted on the platform 27, the leg 54 being fastened to the platform 27 in a pair of bolt and slot assemblies 58, 58. Thus, the passageway 57 may be adjusted to conform to a variable bale width. The bolt and slot assemblies 58, 58 each include a tension spring 59 anchored to the substructure 28 and operative to maintain the guide 51 as maximum displacement from guide 41.

The second guide 52 is laterally spaced between guides 51 and 43 and serves as a central partition between two additional bale passageways 60 and 61. Guide 52 resembles guide 51 having a leg 62 slidably mounted on platform 27, and an upright leg 63 projecting upwardly and perpendicularly to the plane of the platform 27. Guide 52 extends coextensive with guide 43 and has its upper end 62a spaced from guide 42. This space is aligned with opening 47 and side 43 so that a bale deposited on the platform 27 with the accumulator 12 in the second station (FIGURE 7) slides down the platform 27 until its lower end abuts the guide 51. The bale now resting on guide 51 is moved laterally within the confines of passageway 60 by operator of the pusher assembly 31. The bales accumulated in passageway 60 are in this manner arranged in a side-by-side relation.

Guide 52 is also fastened to the platform 27 in a pair of spaced bolt and slot assemblies 55, 55 so that the passageway 60 may be adjusted to conform to a variable bale length. Torsion springs 55a, 55a urge guide 52 away from guide 51 thereby providing for maximum width in the passageway 60.

The passageway 61 defined by guides 52 and 43 is adapted to receive bales fed through opening 48 of side 39 with the accumulator 12 in the third operating station (FIGURE 8). The bales fed through opening 48 pass endwise into passageway 60 forming a row of two bales arranged in and end-to-end relation.

Returning to FIGURE 1, the substructure 28 is pivotally mounted on the A-frame 29 and supports the platform 27 in a tilted attitude. The degree of tilt is such that a bale delivered onto the platform 27 in any of the operating stations slidingly gravitates from the upper end toward the lower end.

As indicated above, the substructure 28 and platform 27 are movable between three operating stations. In the first station (FIGURE 6), side 37 represents the uppermost end of platform 27 and opening 46 is aligned with the discharge end 23 of elevator 11. The passageway 57 defined by guides 41 and 51 receive the first two bales delivered by the elevator 11 forming a two-bale row.

In the second station (see FIGURE 7), the platform 27 has been angularly displaced 90° from the first station and, side 38 now represents the uppermost end with opening 47 confronting the elevator discharge 23. In this position, bales are individually received into passageway 60, the end of each bale resting upon guide 51. The bales received in passageway 60 are moved laterally therethrough by the pusher assembly 31. Four bales are accumulated in a side-by-side relation in passageway 60 forming a second row lying adjacent the first row.

As best seen in FIGURES 2 and 3, the pusher assembly 31 comprises a hydraulic cylinder 66 extending along the underside of the platform 27 and parallel to passageway 60. The cylinder 66 includes a head-end 67 secured to the substructure 28 by means of a bracket 68 and a piston rod 69. The piston rod 69 carries at its distal end a pusher arm 70 which projects upwardly from the platform 27. A connector 71 secures the arm 70 to the piston rod 69 and passes through a slot 72 formed in platform 27 as the piston rod 69 is moved between the retracted and extended positions. The arm 70 has an upright leg 73, the vertical dimension of which is coextensive with that of guide 42. The longitudinal extent of leg 73 is slightly less than the width of passageway 60. In the extended position of piston rod 69, the leg 73 abuts the guide 42 so that bales entering the passageway 60 present a longitudinal side adjacent the leg 73. Now as the piston rod 69 is retracted to the broken-line position of FIGURE 3, the bale is moved approximately one bale width through passageway 60. The piston rod 69 is then returned to its extended home position for receiving a succeeding bale.

In the third operating station of the accumulator 12 which is angularly displaced 90° from the second station and 180° from the first station, side 39 of platform 27 represents the upper side with opening 48 aligned with elevator discharge 23. In this position, passageway 61, defined by guide 52 and 43, receives the final two bales forming a two-bale row arranged in end-to-end relation.

As shown in FIGURES 2 and 3, the radially extending braces 33 have their inner ends terminating at a central portion underlying platform 27. The inner ends are interconnected by additional brace members 74 which in combination form a box-like structure. The downwardly facing side of the box is closed by a plate 76. The plate 76 has a circular opening 77 formed in its center for receiving a stub shaft 78. The stub shaft 78 is welded or otherwise affixed to the substructure 28 and is reinforced by a plurality of radial plates 79. Returning to FIGURE 1, it will be seen that the stub shaft 78 projects downwardly from the substructure 28 and is journally mounted in a sleeve 81 affixed to the A-frame 29. The shaft 78 extends beyond the axial dimension of the sleeve 81 presenting a projection 82 which carries a partial gear 83.

Referring now to FIGURE 5, the partial gear 83 meshes with a gear segment 85. The gear segment 85, in turn, is hinged to the A-frame 29 being pivotable about the axis identified as 84, and has formed therein a crank arm 86. A hydraulic cylinder 87 interconnects the crank arm 86 and the A-frame 29 so that upon actuation of the cylinder 87, the gear segment 83 is pivoted about the axis 84. Thus it will be appreciated that pivotal movement of the gear segment 85 imparts rotary movement to the platform 27 through the gear 83 and shaft 78. The hydraulic control system functions to actuate the gear segment 83 in increments so that the accumulator 12 is rotated in steps of 90° between the three operating stations previously described.

The A-frame 29 includes a pair of leg members 90, 90 joined at one end by the sleeve 81 and interconnected at their opposite ends by a shaft 89. The shaft 89 is journaled to the chassis 17 providing a pivot axes for the A-frame 29. A hydraulic cylinder 91, interconnecting the A-frame 29 and the chassis 17 provides the means for fitting the A-frame 29 and the accumulator 12 about shaft 89 between the home bale receiving position (solid line position of FIGURE 1) and the stack delivery position (broken line position of FIGURE 1).

The control system diagrammatically presented in FIGURES 12–14 provides for automatic opeartion of the accumulator 12. In general, the control system comprises an electro-hydraulic system for selectively actuating the rotating cylinder 87, the pusher cylinder 66, and the tilt cylinder 91.

As indicated in FIGURE 12, the cylinders 66, 91, and 87 are actuated through the operation of directional valves 92, 93, and 94, respectively, which are in turn actuated by solenoids associated therewith. Valve 92 includes solenoids 92a and 92b for controlling hydraulic flow to its associated cylinder 66. Valve 93 includes solenoids 93a and 93b for controlling hydraulic flow to its associated cylinder 91. Likewise, valve 94 includes solenoids 94a and 94b for controlling flow to its associated cylinder 87.

A programmer 95 (FIGURE 13) controls the electrical signals to the solenoids. The programmer 95 includes a ratchet 96 affixed to a cam 97 and an arm 98 for indexing the ratchet 96. Spaced about the periphery of the cam 97 are six switches: 100, 101, 102, 103, 104, and 105. The switches are each actuated by a single cam notch 99 formed in the cam 97. The switches 100–105 are spaced about the periphery of the cam 97 to provide the following relationship: switches 100 and 101 are separated by two index positions of the ratchet 96, switches 101 and 102 by four index positions, switches 102 and 103 by two index positions, switches 103 and 104 by two index positions, switches 104 and 105 by four index positions, and switches 105 and 100 by two index positions. Thus a total of sixteen index positions constitutes one cycle of the programmer 95. The programmer 95 may be positioned on the accumulator 12 or chassis 17 at any convenient location.

The programmer 95 is actuated by a solenoid 106. The solenoid 106 is connected in circuit to switches 107, 108, and 109 which are positioned at openings 46, 47, and 48, respectively (see FIGURES 6, 7, and 8). Switches 107, 108, and 109 are actuably responsive to a bale passing through the openings. Thus as each bale enters through one of the openings 46, 47, or 48, the programmer 95 is indexed one position. One program cycle is completed by delivering sixteen bales to the platform 27, the sixteen bales representing two eight-bale layers.

The projection 82 of the shaft 78 has formed therein a cammed surface 111 (see FIGURE 14). Spaced about the surface 111 are switches 112, 113, 114, and 115 which are actuatably responsive to a raised surface 116 of the cammed surface 111. The switches 112–115 are connected in circuit to selectively energize the solenoids 93a, 93b, 94a, and 94b.

More specifically, switch 101 is connected in series with switch 113 so that actuation of switch 101 completes the circuit to solenoid 94a of valve 94. Hydraulic fluid is directed through the power end of cylinder 87 causing the shaft 78 and hence the platform 27 to rotate counterclockwise as viewed in FIGURE 6. Rotational movement of 90° brings the raised portion 116 of the cam surface 111 into engagement with the switch 113 opening the circuit to solenoid 94a. At this stage of the operation, the platform 27 now occupies the second station (see FIGURE 7).

Switches 117, 118, and 119, positioned in passageway 60 (see FIGURE 7), are connected in circuit with the solenoids 92a and 92b of valve 92, and provide the means for driving the pusher cylinder 66 between the retracted and extended positions. The circuit is activated with the platform 27 in the second operating station which places a lever 120 in the path of a bale entering through opening 147. The lever 120 trips the switch 118 closing the circuit to the solenoid 92a of valve 92. The cylinder 66 and pusher 70 are retracted pushing the bale laterally through the passageway 60. At the end of the retractive stroke of the pusher 70, the bale has been moved away from the spring loaded lever 120 causing the switch 118 to open the circuit to solenoid 92a. The switch 119 which is held open by pusher arm 70 in the home position completes the circuit to the solenoid 92b diverting hydraulic flow to the head end of cylinder 66. This causes the pusher 70 to return to its home position engaging switch 119 and opening the circuit to solenoid 92b. When four bales have been accumulated in this manner in passageway 60, the override switch 117 opens the pusher circuit.

Switch 102 is connected in circuit with switch 115 so that when switch 102 energizes the circuit to solenoid 94a of the valve 94, hydraulic flow is again directed to the power end of cylinder 87 extending the piston rod to its fully extended position. Extension of the piston rod imparts rotary movement to the platform 27 (counterclockwise as viewed in FIGURES 2, 6, 7, and 8). Switch 115 upon engaging the raised portion 116 of cam 111, opens the circuit. This places the platform in the third operating station (see FIGURE 8) which is 90° and 180° angularly displaced from the second and first operating stations, respectively. In this position, the final two bales are received through opening 48, after which the platform 27 is rotated clockwise by actuation of switch 103 (closing of switch 103 closes the circuit to solenoid 94b, thus reversing the direction of hydraulic flow to cylinder 87). Upon returning to the first operating station, switch 112 opens the circuit 94b. Through a conventional relay coil, the circuit to the solenoid 93a of valve 93 is next completed extending cylinder 91 which pivots the platform 27 from the home position to the layer delivery position (see FIGURE 1). At the layer delivery position, a switch 122 (shown schematically in FIGURE 12) is tripped de-energizing solenoid 93a and energizing solenoid 93b which reverses hydraulic flow to cylinder 91. This returns the platform 27 to the home bale receiving position opening switch 123 and the circuit to solenoid 93b.

The second layer is accumulated in the same manner as the first layer by sequentially actuating switches 104, 105, and 100 which functionally correspond to switches 101, 102, and 103, respectively.

Switch 100 is tripped by the final bale of the second layer closing the circuit to the solenoid 94b of valve 94. This causes the platform 27 to rotate in a clockwise direction as viewed in FIGURE 8. The circuit includes the switch 114 which upon being actuated by the raised surface 111 opens the circuit. This places the platform 27 in the second operating position so that as the tilt cylinder 91 is actuated through a conventional relay coil, the second layer is deposited on the bed 90° angularly displaced from the first layer.

When the accumulator is returned to the home position by actuation of switch 112, the circuit to the solenoid 94a of valve 94 is completed causing the platform to rotate clockwise to the first operating station. The programmer 95 and the platform 27 are now positioned to begin the second cycle.

*Operation*

Figure 7:
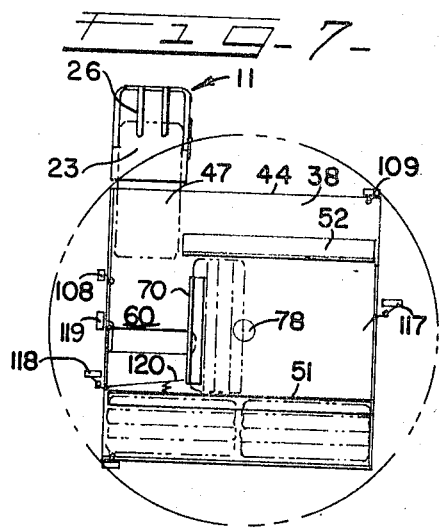
FIGURE 7 is another schematic of the accumulator shown at a subsequent stage in the accumulating operation.

With the accumulator 12 in its home position (solid line position of FIGURE 1), and with the platform 27 in the first operating station (FIGURE 6), the bale wagon 10 is driven through the field with the elevator 11 aligned to receive bales distributed in the field. The first two bales are picked up and deposited on the platform 27 forming a first row of end-to-end bales in passageway 57. Through actuation of the drive means 32 by the programmer 95, the platform 27 is rotated 90° counterclockwise to the second operating station (FIGURE 7). The next four bales are picked up and deposited one at a time on the platform 27 whence they are moved laterally by the pusher assembly 31 until a four-bale row is accumulated. Note that the bales are disposed crosswise of the bales in the first row. The drive means 32 is again actuated rotating the platform 27 90° counterclockwise to the third operating station (FIGURE 8). The final two bales are received in passageway 61 forming a third row of bales, and completing the eight-bale layer. The layer completed, the platform 27 is returned to the first operating station by reversing the actuation of the drive means 32. The tilt cylinder 91 is next actuated causing the platform to move to the layer delivery position. The layer is deposited on the stack receiving bed 13 in the form of a vertical tier supported by the carriage 18. The platform 27 is returned to its home position for accumulating a second layer of bales.

The accumulating operation is repeated forming a second eight-bale layer. However, prior to the tilting of the accumulator 12 to the layer delivery position, the platform 27 is returned to the second operating station. Now, as the second layer is deposited adjacent the first layer on the receiving bed 13, the component bales of one layer are 90° angularly displaced from those of the other layer. The accumulator 12 next returns to the home, bale-receiving position and the platform 27 to the first operating station. This completes the first operating cycle, which, as illustrated, has programmed the operation of the various components in forming two eight-bale layers. The cycle is repeated until a full load comprising vertical tiers of bales is accumulated on bed 13. With a full load of bales, the bale wagon 10 is driven to the storage area where the cylinder 19 is actuated upending the bed 13 thereby depositing the load of bales on the ground (see FIGURE 9). In this position, the vertical tiers are transposed to horizontal layers with the bales of each layer arranged in a crosstied fashion with respect to vertically adjacent bales.

The particular pattern contemplated by this invention lends itself readily to the formation of a crosstied pattern which adds stability to the ground deposited stack.

As best seen in FIGURES 10 and 11, layer A and layer B, representing the first and second layers, respectively, accumulated in one cycle of the programmer 95, are arranged in identical patterns but are oriented 90° angularly displaced from each other. This particular arrangement positions the bales of the upper layer B to overlay one-half of a vertically adjacent bale of the lower layer A. The interlacing or interlocking of the bales produces an extremely stable stack. The interlocking relationship is better seen in FIGURE 11 wherein the pattern A is shown in dotted lines and pattern B in solid lines.

Although the preferred embodiment presented herein has been described in particular detail, it should be understood that the description is by way of illustration only, and that modifications may be made therein without departing from the scope and spirit of the invention as set forth in the appended claims.

What is claimed is:
1. A bale wagon for accumulating a load of bales on a receiving bed, said bale wagon comprising:
    a chassis;
    an elevator mounted on said chassis;
    a platform mounted on said chassis and arranged to receive bales individually delivered by said elevator, said platform including means for singly receiving a first group of bales and arranging said group into a first row, means for angularly displacing said first row 90° about an axis normal to said platform, means for singly receiving a second group of bales and moving said bales laterally across said platform to form a second row adjacent said first row, the bales of said second row being arranged in a side-by-side relation and disposed crosswise of the bales of said first row, and means for receiving a third group of bales to form a third row adjacent said second row; and
    means for depositing said rows as a unit on said receiving bed.

2. The bale wagon as recited in claim 1 wherein
    said platform is pivotally mounted on said chassis, and is normally disposed in a first operating position,
    said means for angularly displacing said first row includes means for pivoting said platform to a second operating position 90° removed from said first operating position, and said means for moving said bales to form said second row includes a bale pusher assembly operable responsive to said platform being positioned in said second operating position to move bales at least one bale thickness.

3. The bale wagon as recited in claim 2 wherein said means for receiving a third group of bales to form a third row includes means to move said platform to a third operating position 90° removed from said second operating position and 180° removed from said first operating position, said platform in said third operating position aligned with said elevator to receive bales individually delivered thereby to form a row of end-to-end disposed bales.

4. The bale wagon as recited in claim 3 wherein said platform is pivotally mounted on said chassis and said means for depositing rows on said receiving bed includes pusher means for pivotally moving said platform to align with said receiving bed whereby said rows are deposited thereon.

5. The bale wagon as recited in claim 3 wherein said means for depositing said rows as a unit on said receiving bed further includes means for controlling the position of said platform whereby said rows may be selectively deposited on said bed with said platform at any one of said operating positions.

6. A bale wagon for mechanically accumulating a load of elongated bales, said bale wagon comprising:
   a chassis;
   an elevator mounted on said chassis;
   a four-sided platform for accumulating a layer of bales, said platform being mounted on said chassis and pivotable about an axis normal to the plane of said platform whereby bales may be selectively received from said elevator on either of two rectangularly disposed sides;
   means for moving bales on said platform to form rows of bales thereon, the bales of one row having their longitudinal axes perpendicular to those of bales of another row; and
   means for moving said platform to deposit said layer on a receiving bed.

7. A bale wagon for mechanically accumulating a load of elongated bales, said bale wagon comprising:
   a chassis;
   an elevator mounted on said chassis;
   a receiving bed;
   a four-sided platform for accumulating bales delivered by said elevator into a layer, said platform having a first position wherein one side of said platform is disposed adjacent said elevator for receiving bales delivered thereby, and means for arranging said received bales to form a first row of bales, said platform having a second position wherein another side of said platform, is disposed to receive bales delivered by said elevator, and means for moving said bales received in said second position to form a second row of bales;
   said first and second positions being 90° angularly displaced so that bales of said first row are disposed perpendicular to bales of said second row, said platform being movable to deposit said layer on said receiving bed;
   a third position presenting a third side adjacent said elevator for receiving a third group of bales, said platform including means for arranging said third group of bales into a third row, said third row being parallel to said first and second rows, and the individual bales of said third group being crosswise of those of said second group; and
   means for selectively moving said platform to said positions.

8. A bale wagon for mechanically accumulating a load of bales, said bale wagon comprising:
   a chassis;
   an elevator mounted on said chassis;
   a four-sided platform pivotally mounted on said chassis and having a first position wherein a first side of said platform is arranged to receive individual bales delivered by said elevator,
   means for pivoting said platform to a second position wherein a second side of said platform is arranged to receive individual bales delivered by said elevator,
   means for pivoting said platform to a third position wherein a third side of said platform is arranged to receive individual bales delivered by said elevator, said platform including means for accumulating bales received in said first, second, and third positions into first, second, and third rows, respectively, the longitudinal axes of the bales in said first and third rows being parallel and the longitudinal axes of bales in the second row being perpendicular to those of bales in said first and third rows.

9. In a bale wagon of the type having a receiving bed for accumulating a load of bales delivered thereto by a bale elevator, said receiving bed being pivotable to an upended position for depositing said load upon the ground, a layer-forming accumulator comprising:
   a platform having a first position presenting a first side opposite said elevator for receiving a first group of bales, said platform including means for arranging said first group of bales into a first row, means for moving the platform from the first position to a second position, said second position presenting a second side opposite said elevator for receiving a second group of bales, said platform including means for individually moving said bales of said second group laterally thereby forming a second row of bales, said second row being parallel to said first row and the individual bales of said second row being crosswise of said first row.

10. A bale wagon as recited in claim 9 and further comprising:
    means for upending said platform to deposit said rows on said receiving bed,
    and control means for selectively upending said platform in any of said positions whereby the rows of one layer may be deposited crosswise of rows of a succeeding layer.

11. A bale wagon as decited in claim 10 wherein said platform is tilted rearwardly and downwardly relative to said elevator so that bales delivered by said elevator gravitate down said platform.

12. A bale wagon as recited in claim 9 wherein said means for individually moving said bales of said second group includes a pusher for moving the bales laterally at least one bale thickness.

13. In a bale wagon of the type having an elevator for picking up bales, an accumulator for receiving bales delivered by said elevator and arranging said bales into a layer, and a receiving bed for receiving layers delivered by said accumulator, an improved accumulator comprising: a platform arranged to receive bales individually delivered by said elevator, and including first means associated with the plaform to arrange the received bales in a first row on the platform, the attitude of bales of said first row being the same as that of the received bales, means for reorienting said first row relative to said elevator prior to receiving additional bales from said elevator, and second means on said platform for arranging said additional bales delivered by said elevator into a second row, the attitude of the received bales of the second row being 90° displaced from that of the received bales of the first row, said first and second rows being parallel and bales of said first row being perpendicular to the bales of said second row.

References Cited

UNITED STATES PATENTS

| 3,260,380 | 7/1966 | Skromme et al. |
| 3,289,859 | 12/1966 | Tarbox. |
| 3,373,882 | 3/1968 | Forest. |
| 3,381,828 | 5/1968 | Sheehan. |
| 3,395,814 | 8/1968 | Grey. |
| 3,400,839 | 9/1968 | Jay et al. |

GERALD M. FORLENZA, Primary Examiner.

ROBERT J. SPAR, Assistant Examiner.

U.S. Cl. X.R.

214—501